United States Patent
Kawasaki et al.

(10) Patent No.: US 7,589,432 B2
(45) Date of Patent: Sep. 15, 2009

(54) DEVICE FOR CONTROLLING CONTROLLED VARIABLE BY ON/OFF SWITCHING OPERATIONS WITH LESS NOISE MANNER

(75) Inventors: Koji Kawasaki, Anjo (JP); Keiji Shigeoka, Okazaki (JP); Shinya Goto, Gifu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 155 days.

(21) Appl. No.: 11/395,279

(22) Filed: Apr. 3, 2006

(65) Prior Publication Data
US 2006/0226710 A1 Oct. 12, 2006

(30) Foreign Application Priority Data
Apr. 1, 2005 (JP) .............................. 2005-105841

(51) Int. Cl.
*B60L 1/00* (2006.01)
(52) U.S. Cl. ...................................................... 307/10.1
(58) Field of Classification Search .................. 307/129, 307/10.1
See application file for complete search history.

(56) References Cited

U.S. PATENT DOCUMENTS

| | | | |
|---|---|---|---|
| 5,488,627 | A | 1/1996 | Hardin et al. |
| 6,538,484 | B1 | 3/2003 | Rappaport et al. |
| 6,549,429 | B2 | 4/2003 | Konno |
| 6,674,789 | B1 * | 1/2004 | Fardoun et al. ............. 375/132 |
| 7,269,035 | B2 * | 9/2007 | Kawasaki et al. ............. 363/41 |
| 2003/0026116 | A1 | 2/2003 | Ueki et al. |
| 2006/0140286 | A1 | 6/2006 | Goto et al. |

FOREIGN PATENT DOCUMENTS

| | | |
|---|---|---|
| DE | 10 2005 062 451 A1 | 7/2006 |
| JP | A-2001-218461 | 8/2001 |
| JP | A-2002-335672 | 11/2002 |
| JP | A-2003-79134 | 3/2003 |
| JP | A-2003-79135 | 3/2003 |
| JP | A-2003-88101 | 3/2003 |

OTHER PUBLICATIONS

U.S. Appl. No. 11/319,062, filed Dec. 28, 2005, Goto et al.
Patent Office of the People's Republic of China, First Office Action, Chinese Patent Application No. 2006101534302, Jun. 13, 2008, China.

* cited by examiner

*Primary Examiner*—Robert L. DeBeradinis
(74) *Attorney, Agent, or Firm*—Oliff & Berridge, PLC

(57) ABSTRACT

A switching device comprises a switching element, a setting member, and a control member. The switching element turns on/off in response to a drive signal, so as to control a controlled variable of a controlled system to a desired amount. The setting member sets the drive signal on the basis of both a desired duty to control the controlled variable, wherein the drive signal is set by repeating a basic pattern consisting of a plurality of intervals which are decided to remove overlaps, in a frequency spectrum, between or among switching frequencies produced based on an interval between start timings of the on operations and an interval between start timings of the off operations. The control member variably controls the switching element based on the drive signal.

18 Claims, 15 Drawing Sheets

[DOUBLE SPREAD IN AUDIO RANGE]

[DOUBLE SPREAD OUTSIDE AUDIO RANGE]

BASIC PATTERN 1

BASIC PATTERN 2

(USABLE DUTY OF BASIC PATTERN 1)

(USABLE DUTY OF BASIC PATTERN 2)

[USABLE DUTY]

| PATTERN / Duty | BASIC PATTERN 1 | BASIC PATTERN 2 | ··· | BASIC PATTERN N |
|---|---|---|---|---|
| 1% | ○ | ◌ | | ◌ |
| 2% | ○ | × | | ◌ |
| ⋮ | | | | |
| 50% | × | ○ | | × |
| 51% | ◌ | ○ | | × |
| ⋮ | | | | |
| 99% | ◌ | ◌ | | ○ |

DEVICE FOR CONTROLLING CONTROLLED VARIABLE BY ON/OFF SWITCHING OPERATIONS WITH LESS NOISE MANNER

CROSS REFERENCE TO RELATED APPLICATION

The present application relates to and incorporates by reference Japanese Patent application No. 2005-105841 filed on Apr. 1, 2005.

BACKGROUND OF THE INVENTION

1. Field of the Invention

The present invention relates to a switching device equipped with a controller duty-controlling a controlled variable of a controlled system to a desired amount, and in particular, to the switching device that is able to perform such a control by making a switching element turn on/off with less noise due to the switching operations of the switching device.

2. Description of the Related Art

In general, on-vehicle power electrical equipment is equipped with a switching device that uses a power switching device. This kind of power switching device is on/off-operative on, for example, pulse width modulation (PWM). Hence, controlling the on/off operations of the power switching device allows controlled systems, such as DC-DC converter on a hybrid car, to have a desired amount of controlled variable.

Especially, when the controlled variable shows a desired target amount, the power switching element is then subjected to periodical on/off operations. Such operations are likely to raise the energy of only noise components whose frequencies correspond to switching frequencies and their harmonic frequencies, which are due to intervals between start timings of the on operations and/or the off operations. Such noise components of higher energy are occasionally superposed on a broadcasting signal tuned by an on-vehicle radio receiver or other similar radio devices. In such an undesired situation, the speaker of a car radio is obliged to output bloop for users.

To resolve this drawback, Japanese Patent Laid-open Publication No, 2002-335672 and 2003-88101 disclose a countermeasure for noise removal. That is, in those documents, a switching frequency is decided such that its harmonics are related to a broadcasting frequency band by a predetermined relationship. Practically, the predetermined relationship is that the harmonics have a specific frequency difference from a tuned broadcasting frequency. This is helpful for preventing the speaker from outputting the noise.

However, in such countermeasures, if modes of the on/off operations carried out by the power switching element are changed by, for instance, the PWM control, the possibility that a switching frequency or its harmonics overlaps with a tuned broadcasting frequency cannot be denied.

SUMMARY OF THE INVENTION

The present invention has been completed with the above view in mind and has an object to provide a switching device which is capable of reducing noise (especially, peaks of noise) due to switching control, in cases where a controlled system provided with the switching device controls a controlled variable to a target amount.

As one aspect, the present invention provides a switching device, comprising: a switching element turning on/off in response to a drive signal, so as to control a controlled variable of a controlled system to a desired amount; setting means for setting the drive signal on the basis of both a desired duty to control the controlled variable, wherein the drive signal is set by repeating a basic pattern consisting of a plurality of intervals which are decided to remove overlaps, in a frequency spectrum, between or among switching frequencies produced based on an interval between start timings of the on operations and an interval between start timings of the off operations; and control means for variably controlling the switching element based on the drive signal.

Preferably, the plurality of intervals each having a duty defined as a ratio of an on period or an off period of the switching element to either the interval between the start timings of the on operations or the interval between the start timings of the off operations.

For example, the basic pattern consists of the plurality of intervals which are decided to mutually differentiate the intervals between the start timings of either the on operations or the off operations. It is preferred that the control means includes duty control means for variably controlling the duty of the respective intervals depending on the desired amount.

Still preferably, a period of time of the basic pattern composed of the plurality of intervals provides is set to have a frequency that spreads switching frequencies, formed on the intervals between the leading edges and between the falling edges of the drive pulses, into a frequency range higher than specified audio frequencies.

BRIEF DESCRIPTION OF THE DRAWINGS

In the accompanying drawings.

DETAILED DESCRIPTION OF PREFERRED EMBODIMENTS

Various embodiments of the switching device according to the present invention will now be described below in detail with reference to the accompanying drawings.

First Embodiment

Referring to FIGS. 1-12D, a first embodiment will now be described. The first embodiment provides a switching device for a DC-DC converter to be amounted on a hybrid vehicle (i.e., gas-and-electric car).

Figure 1:
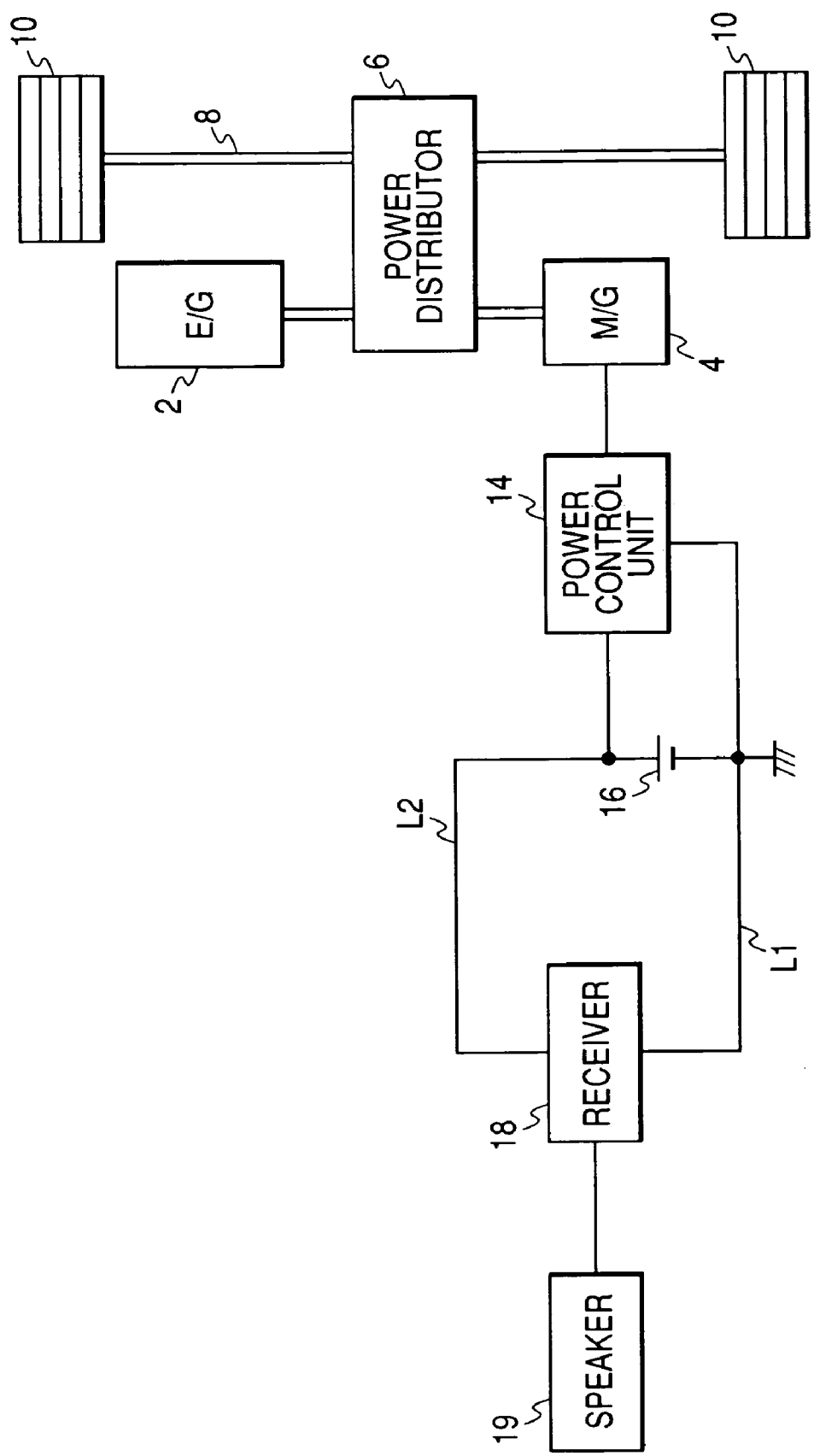
FIG. 1 shows in blocks the configuration of an essential part, including a power control unit, of a hybrid vehicle according to a first embodiment of the present invention.

FIG. 1 outlines the configuration of such a hybrid vehicle. As shown therein, the hybrid vehicle is provided with an internal combustion engine 2, a motor generator 4, a power distributor 6, a drive shaft 8, and drive wheels 10. Drive power, which is generated by the engine 2 and the motor generator 4, is transmitted to the drive wheels 10 via the power distributor 6 and drive shaft 8.

In addition to providing the drive power to the power distributor 6, the motor generator 4 is configured to generate power by using drive power supplied from the power distributor 6. This motor generator 4 is electrically connected with a power control unit 14 provided with a DC-DC converter, an inverter, and a high-voltage battery, which will be described later. The power control unit 14 is configured to convert AC power, generated by the motor generator 4, to DC power and stores the converted DC power. In addition to this, the power control unit 4 is configured to step down high-voltage power to provide a battery 16 with the stepped-down power.

This hybrid vehicle is equipped with a radio receiver 18 and a speaker(s) 19. This radio receiver 18 has both an AM receiver and an FM receiver. The AM receiver, which receives modulated wave produced by modulating a carrier wave on analog amplitude modulation (AM), detects and demodulates the modulated wave so as to output an audio signal to the speaker 19. The frequency band allocated to AM broadcasting is, for example, "510 to 1720 khz." On the other hand, the FM receiver receives modulated wave produced on frequency modulation (FM) and detects and modulates the modulated wave so that an audio signal is outputted to the speaker 19. The frequency band allocated to FM broadcasting is, for example, "76 to 108 MHz."

Figure 2:
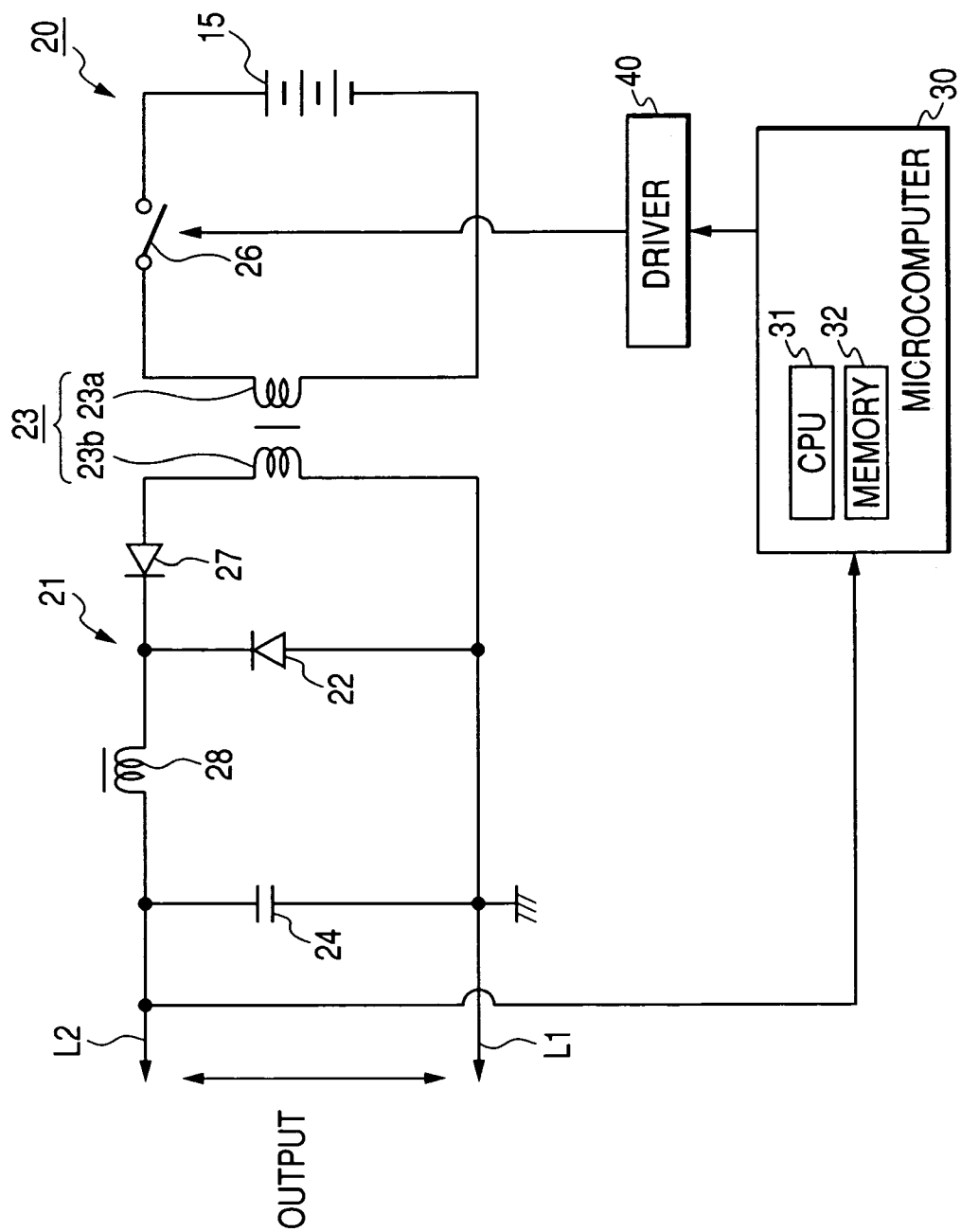
FIG. 2 is a circuit diagram showing the configuration of a DC-DC converter equipped in the power control unit, the DC-DC converter having a switching device according to the present invention.

As shown in FIG. 2, the power control unit 14 is provided with a DC-DC converter 20 and a controller 30 serving as a main part of the switching device of the present invention.

The DC-DC converter 20 is formed as an insulated type of DC-DC converter. This DC-DC converter 20 is provided, as shown, with a high-voltage battery 15 storing the DC power produced from the AC power by the motor generator 4, a serial circuit composed of a power switching element 26 and a coil 23a of a transformer 23, and a low-voltage circuit 21 outputting low-voltage power to the battery 16. The low-voltage circuit 21 is provided with a coil 23b of the transformer 23, diodes 22 and 27, a coil 28, and a capacitor 24. Both the diode 27 and the coil 28 are electrically connected in series to the coil 23b of the transformer 23. The diode 22 is electrically inserted between the diode 27 and the coil 28. The capacitor 24 is connected to the output side of the coil 28 and the ground. In this DC-DC converter 20, the above configuration allows the power switching element 26 to be turned on/off repeatedly in a controlled manner, so that the output from the DC-DC converter 20 is controlled by the switching control.

The controller 30 is composed of a microcomputer having a CPU (central processing unit) 31, a memory 32 and other necessary components (not shown). The controller 30 is formed to take in the output of the DC-DC converter 20 and to command the driver 40 to control the turning-on/off operations of the power switching element 26 based on PWM control (i.e., switching control), so that the DC-DC converter 20 provides a desired output value. Specifically, the driver 40 serves as outputting drive pulses to the power switching element 26 in a controlled manner, whereby the drive pulses enables the power switching element 26 to be turned on/off.

Accordingly, the switching device of the present invention is provided with the power switching element 26, controller 30 and driver 40.

The above switching control may, depending on its control mode, cause noise to be mixed with a broadcasting signal tuned by the receiver 18. The noise caused due to the switching control include not only radiation noise attributable to the switching control itself but also noise to be transmitted through lines L1 and L2 connected to the receiver 18 (refer to FIGS. 1 and 2). As shown in FIG. 1, the line L1 electrically connects the ground terminal of the receiver 18 and the power control unit 14 (practically, the DC-DC converter 20). On the other hand, the line L2, which electrically connects the receiver 18 and the battery 16, is also electrically connected to the power control unit 14 (practically, the DC-DC converter 20). Hence the noise coming from the DC-DC converter 20 is likely to enter the receiver 18 via the lines L1 and L2.

This noise, which is due to the switching control, will appear and mixes with a tuned broadcasting signal at the receiver 18 only when a drive signal for the switching control or the harmonics of the drive signal overlaps in their frequencies with the tuned broadcasting signal at the redeliver 18 in their frequency ranges. With reference to FIGS. 3A-3C, 4 and 5, this noise generation will now be detailed.

Figure 3A:
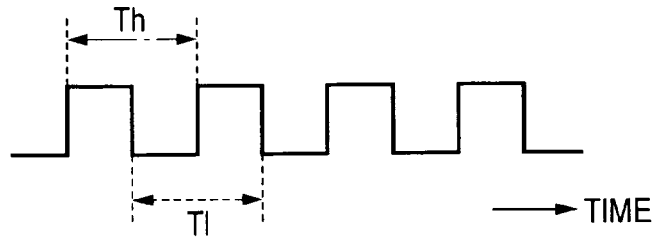
FIGS. 3A-3C explain a drawback resulting from switching control carried out in the DC-DC converter.

FIG. 3A illustrates an example of the foregoing drive pulse to drive the power switching element 26. As shown, the drive pulse exhibits level-raised state (on state) periods (periods during which the logical "H" level is kept) and non-raised-state (off state) periods (periods during which the logical "L" levels is kept). The power switching element 26 is brought into its "on" state during either the raised-state or non-raised-state periods. For example, in cases where the power switching element 26 is composed of an N-channel MOS transistor, the logical "H"-level periods of the drive pulse become active so that the N-channel MOS transistor is made to turn on. Alternatively, in cases where the power switching element 26 is composed of a P-channel MOS transistor, the element is made to turn on during the logical "L"-level periods of the drive pulse.

In the present embodiment, the switching control will now be conducted with assuming that the power switching element 26 is made to turn on during each of the logical "H"-level periods of the drive pulse.

Figure 3B:
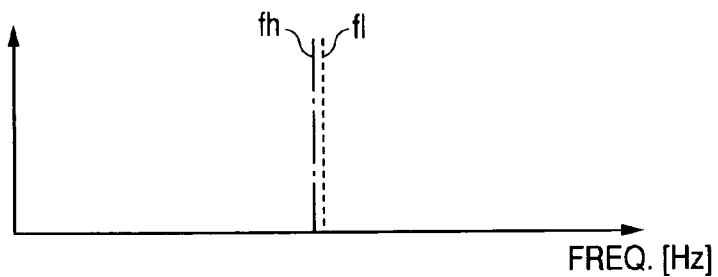
Figure 3C:
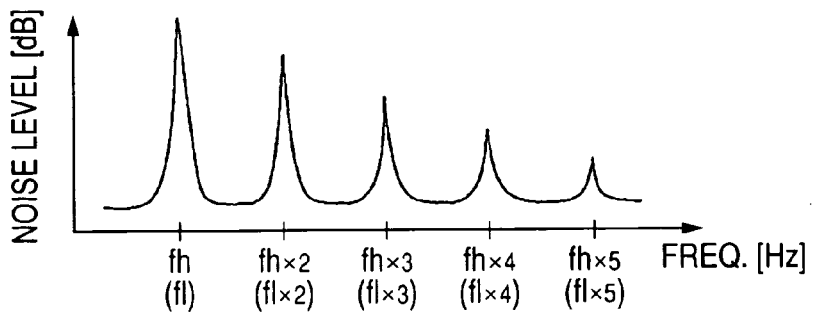

In the example shown in FIG. 3A, an interval (a period of time) Th between rising edges (i.e., timings at which "ON" operations start, respectively) of drive pulses and an interval (a period of time) Tl between falling edges (i.e., timings at which "OFF" operations start, respectively) of the drive pulse are decided to be equal to each other. Thus, as shown in FIG. 3B, switching frequencies of the "ON" and "OFF" operations, which are reciprocal numbers of the intervals Th and Tl, respectively, are also equal to each other. Hence, the energy levels of signals (that is, noise) at the switching frequencies fh and fl becomes large. For the sake of an easy understanding, the switching frequencies fh and fl are spread (or sifted) from each other in FIG. 3B. Therefore, as shown in FIG. 3C, at the switching frequency fh (or fl) and frequencies of its harmonics "fh×2, fh×3, fh×4, fh×5, . . . (fl×2, fl×3, fl×4, fl×5, . . . ), the noise has large levels.

Figure 4:
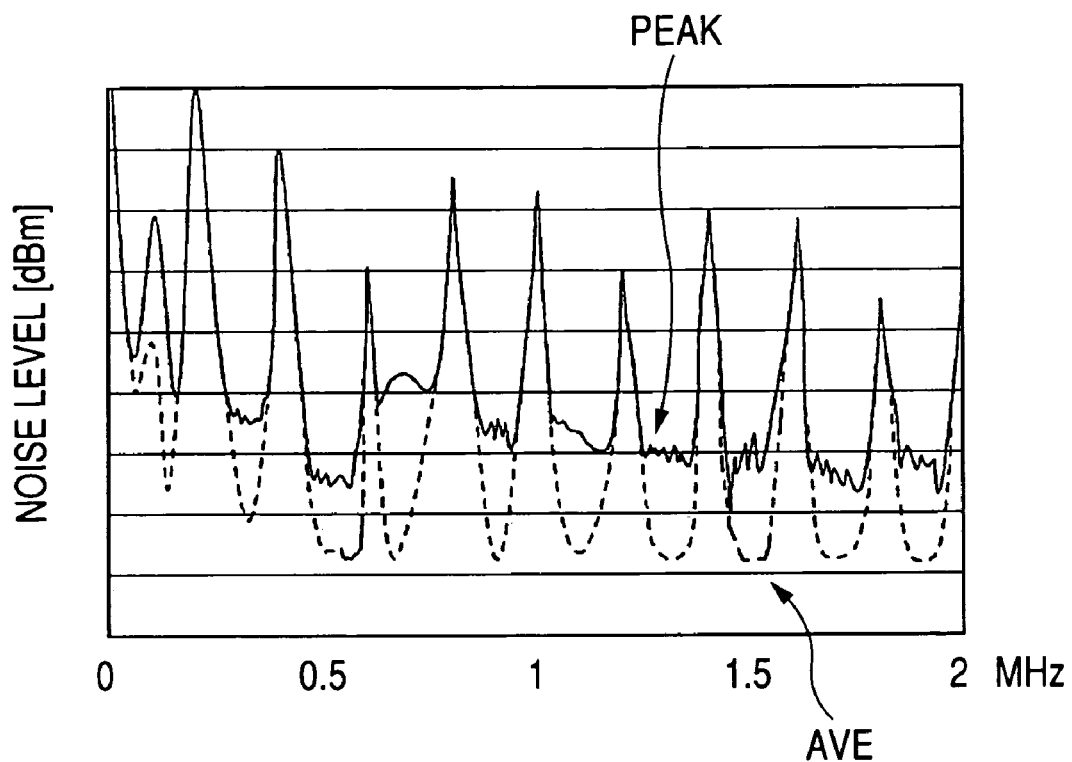
FIG. 4 is a graph showing results of an experiment carried out concerning with noise caused by the switching control.

FIG. 4 contains graphs which show energy levels (experimental values) of noise caused by switching control using the drive pulse shown in FIG. 3A. In the graph, a solid line "PEAK" indicates peak noise levels and broken lines "AVE" indicate average noise levels, both of which are large I levels.

To reduce energy levels of noise resulting from switching control based on a switching frequency, the following measures are possible. One possible measure is PWM control in which periods of duty of respective drive pulses are made random. Another possible measure is PWM control which uses a plurality of frequencies. Another possible measure is switching control using a pulse pattern in which leading edges and falling edges of drive pulses are dispersed in timings with each other so that the leading and falling edges are not repeated at intervals.

Figure 5:
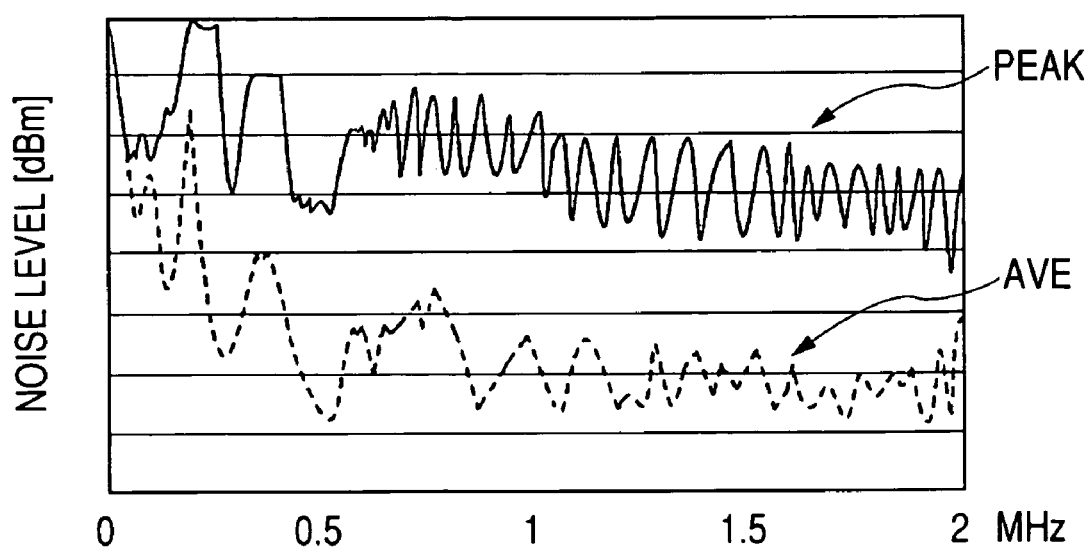
FIG. 5 is a graph showing results of another experiment carried out concerning with noise caused by the switching control.

FIG. 5 shows energy levels (experimental values) of noise which is typically induced from switching control involving the above measures. As understood from the graphs in FIG. 5, using the above measures makes it possible that the average energy levels of the noise are lowered largely, compared to those shown in FIG. 4.

Though the energy levels of the noise are lowered, bacnoise will be outputted from the speaker 19 in cases where a switching frequency and its harmonic frequencies are overlapped with a broadcasting frequency tuned by the receiver 18. Of course, the backnoise will be eliminated if the switching frequency and its harmonic frequencies are designated as values which are different from broadcasting frequencies to be turned by the speaker 19. However, such a setting is difficult, as described.

In the present embodiment, to cope the above-described difficulty, a drive pulse pattern is set such that the pattern is composed of plural drive pulses which provide not only mutually different intervals between on-operation start timings (i.e., leading edges of the respective drive pulses) but also mutually different intervals between off-operation start timings (i.e., falling edges of the respective drive pulses). This way of setting allows switching frequencies to be spread (or dispersed) in the drive pattern. By repeating this drive pulse pattern cyclically, a spread frequency, which is calculated as an inverse number of the repetition cycle T of this pattern, can be set to a value higher than audio frequencies.

Figure 6A:
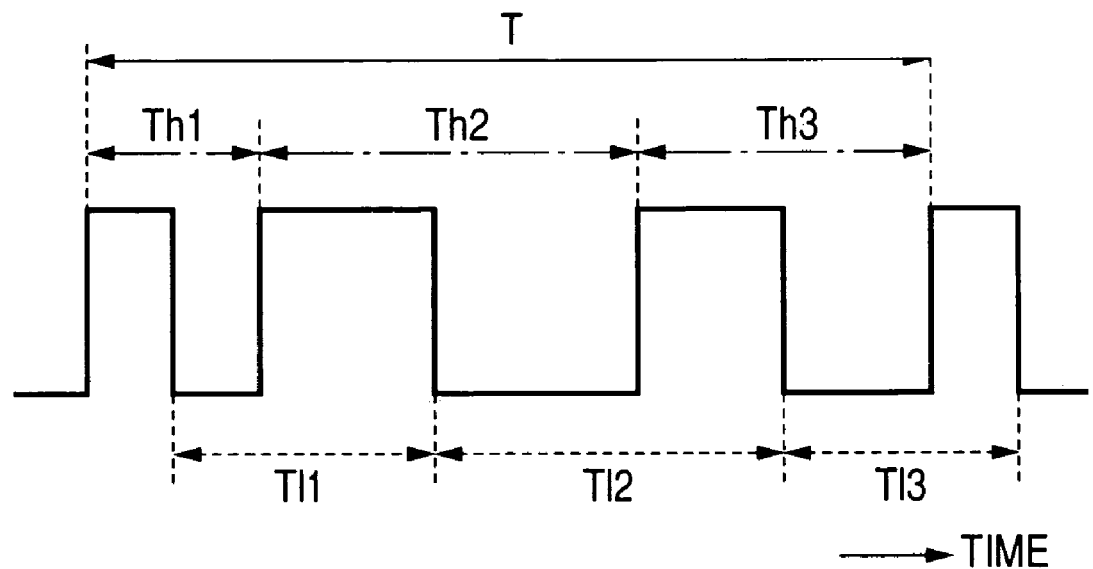
FIG. 6A is a pulse wave exemplifying a mode of the switching control according to the first embodiment.
Figure 6B:
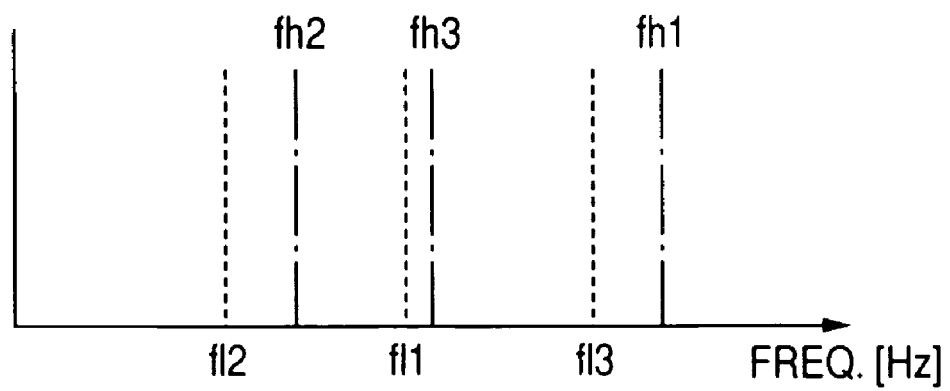
FIG. 6B is a frequency spectrum based on the mode of the switching control shown in FIG. 6A.

FIG. 6A exemplifies a drive pulse pattern consisting of three drive pulses which have mutually different intervals between their leading edge and mutually different intervals between their falling edges. In this example, all of the intervals Th1-Th3 between the leading edges and the intervals Tl1-Tl3 between the falling edges are different from each other. Hence, both switching frequencies fh1-fh3 calculated based on the intervals Th1-Th3 and switching frequencies fl1-fl3 calculated based on the intervals Tl1-Tl3 are also made different from each other, resulting in that, as shown in FIG. 6B, all the switching frequencies fh1-fh3 and fl1-fl3 are spread (i.e., dispersed or differentiated) to each other. Therefore, the levels of noise attributable to those switching frequencies will be lowered on average.

However, though the above setting of the intervals is effective in reducing the noise levels, in cases where any one of the switching frequencies fh1-fh3 and fl1-fl3 or any one of their harmonic frequencies is overlapped with an AM broadcasting frequency tuned by the receiver 18, noise sill be outputted from the speaker 19. Considering this condition, the present embodiment uses a drive pulse pattern whose repetition cycle T provides, as an inverse number thereof, a spread frequency is over the audio frequencies. Thus, even though the above frequency overlap is caused, an inverse number of the interval between one overlap to the next overlap is higher than the audio frequencies. Thus, due to the fact that the frequencies of noise outputted from the speaker 19 are out of the audio frequency band, it is possible to positively and well suppress audible noise to be overlapped with a broadcasted audio signal from the speaker 19.

Incidentally, the above frequencies over the audio frequencies may be defined as, for example, "20 kHz or higher," because the audio frequencies are generally "20 to 20 kHz." This setting is just an example, not a definitive list. The individuals have audibility which is different person by person, but persons who can hear an audio signal of, for example, "20 kHz" are rare. Thus the spread frequency may be set to, for example, "15 kHz or higher," still providing a good noise suppression similarly to the foregoing.

Figure 7A:
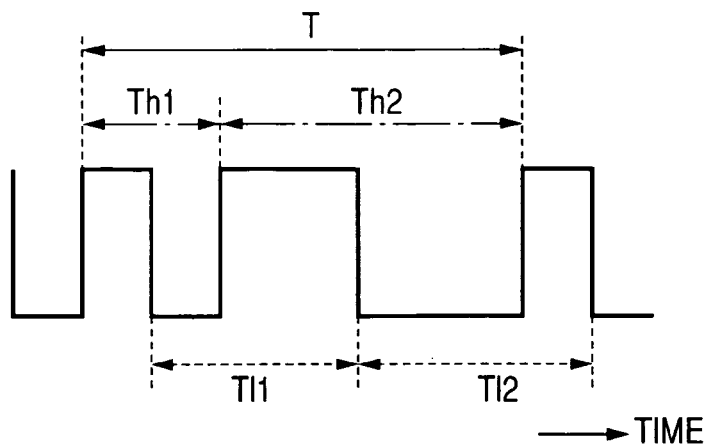
FIG. 7A is a pulse wave exemplifying another mode of the switching control according to the first embodiment.
Figure 7B:
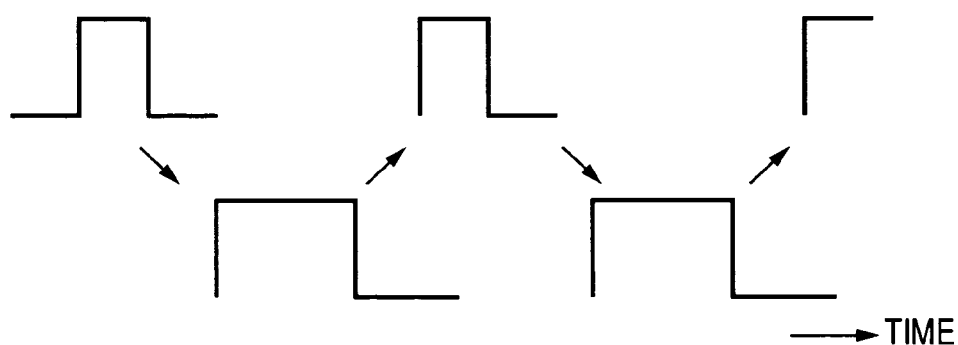
FIG. 7B is an illustration showing switchovers from one drive pulse to another drive pulse in a basic pattern.

FIG. 7A exemplifies another drive pulse pattern consisting of two drive pulses which have mutually different intervals between their leading edge and mutually different intervals between their falling edges. In this example, all of the intervals Th1-Th2 between the leading edges and the intervals Tl1-Tl2 between the falling edges are different from each other. In addition, an inverse number of the repetition cycle T formed by the two drive pulses, which is a spread frequency (i.e., repetition frequency), is set to values higher than audio frequencies. This makes it possible that, as illustrated in FIG. 7B, the two different drive pulses in the basic pattern are switched from one to the other at a speed faster than the designated audio frequencies.

Figure 7C:
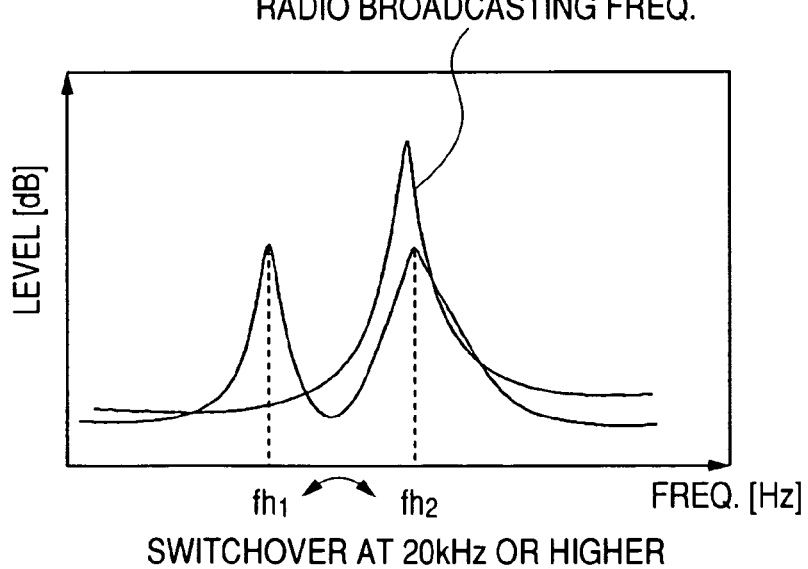
FIG. 7C is a frequency spectrum based on the mode of the switching control shown in FIG. 6C.

In this way, by switching the drive pulses faster than the audio frequencies, the speaker 19 is able to output an audio signal with no switching-control-oriented noise mixed in the audio frequency range of the output, as explained in FIG. 7C, even when, for example, the switching frequency fh2 corresponding to the interval Th2 is made to agree with a frequency (e.g., "600 kHz") of an AM radio broadcasting by a radio station.

It is noted, however, that, as exemplified in FIG. 7C, in the case that the switching frequencies are within the AM radio broadcasting frequency band, a difference between the switching frequencies to be spread (dispersed) is set larger than a frequency band per AM radio broadcasting. To be specific, for example, in Japan, the frequency band of each AM radio broadcasting is allocated to "9 kHz." Similarly to this, in general, the frequency band given to each broadcasting is determined in advance. Thus the switching frequencies are spread from each other so that the difference between the switching frequencies is larger than the frequency band. Therefore, even though a broadcasting frequency received by the receiver 18 coincides with one of the switching frequencies, it is avoidable that all the switching frequencies agree with a particular broadcasting frequency, resulting in that the overlapping in the frequencies can be localized (or limited) in the frequency band.

The FET characteristics of audio signals broadcasted by the AM radio were evaluated between two cases where a spread frequency is set within and outside the audio frequencies. The evaluated results are shown in FIGS. 8A and 8B.

Figure 8A:
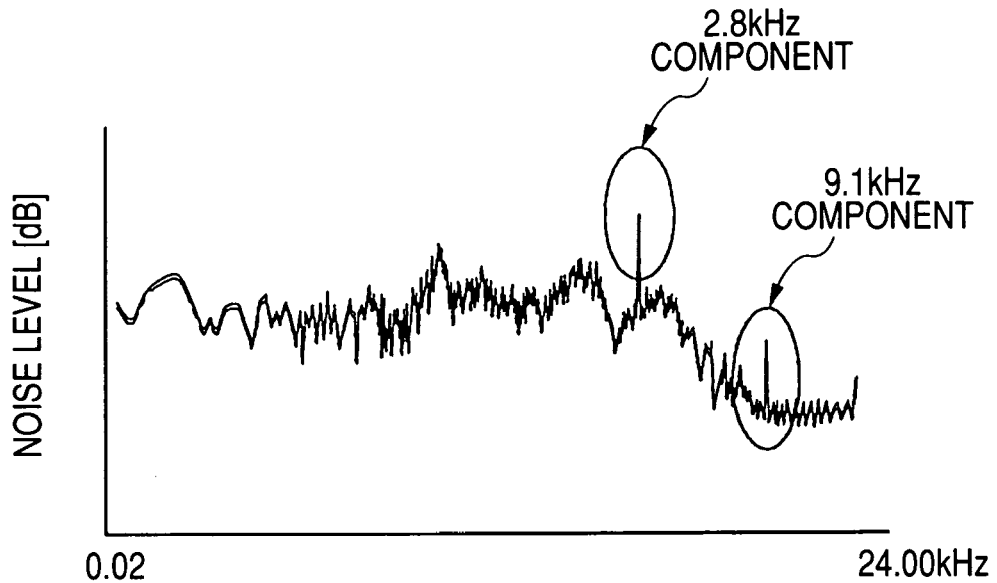
FIGS. 8A and 8B are frequency spectrums each showing measurement results of noise to be caused by the switching control according to the first embodiment.
Figure 8B:
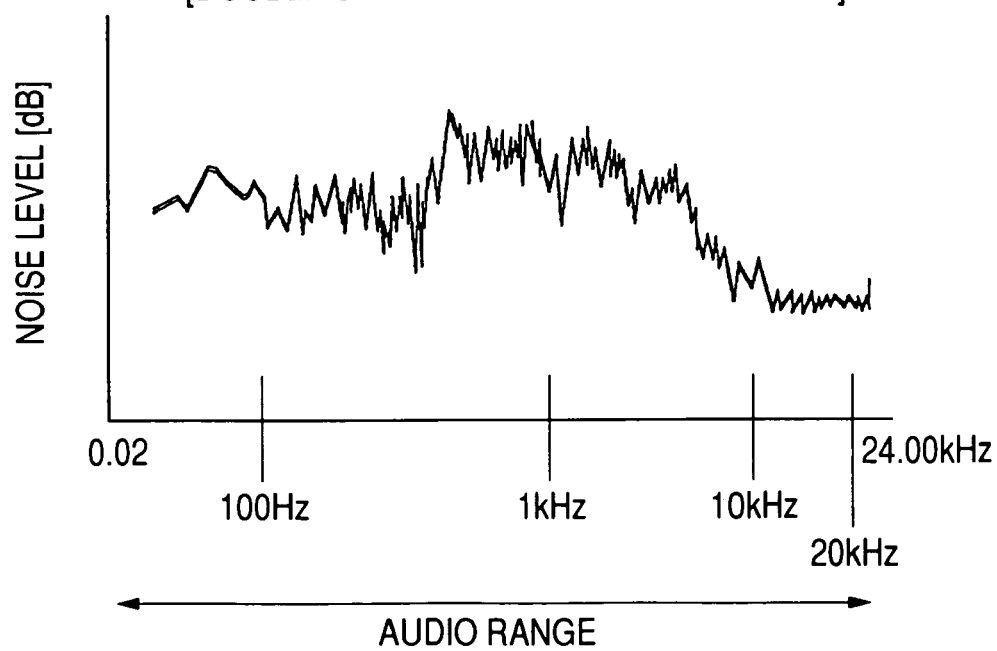

Graphs in FIGS. 8A and 8B, which resulted from the use of two different drive pulses shown in for example FIG. 7A, are produced by shifting switching frequencies between the two drive pulses, and then performing an FFT analysis on the audio signal from the speaker 19 (i.e., the AM receiver). In FIG. 8A, the spread frequencies are within the audio frequencies, while in FIG. 8B, the spread frequencies are higher than the audio frequencies.

In the case of the FFT-analyzed results shown in FIG. 8A, noise is superposed on the audio signal at a frequency of "2.8 kHz," whereby the speaker 19 outputs "peep" noise. In addition, at a frequency of "9.1 kHz," the noise is superposed on the audio signal, whereby the speaker 19 outputs "squeak" noise. In contrast, the FET-analyzed results shown in FIG. 8B provide no noise peaks within the audio frequency band.

In this way, by performing the switching control based on the drive pulse pattern illustrated in either FIG. 6A or FIG. 7A, it is possible to avoid the speaker 19 from outputting noise existing in the audio frequency band, that is, audible noise.

By the way, in order to control the output of the DC-DC converter 20 to a desired amount, the drive pulses should not be fixed, but be changed. Some modes for changing the drive pulses include a situation in which the foregoing relationship for both of intervals between the leading edges and intervals between the failing edges is not met. If the switching frequencies are overlapped with each other, some difficulties, such as a swell in energy levels of noise radiated in response to the switching control, will be caused. This will now be detailed more.

In the present embodiment, a basic pattern for setting intervals between the leading edges of drive pulses to some different amounts (i.e., intervals) is previously memorized in the memory 32 of the controller 30 shown in FIG. 2. The leading edges is subjected to duty control so as to decide a duty (or duty ratio, duty cycle) desired for controlling the output of the DC-DC converter to a desired amount.

Figure 9A:
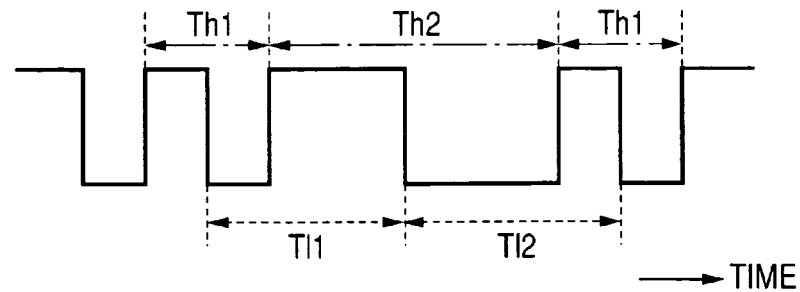
FIGS. 9A and 9B explain a drawback resulting from duty control carried out in the DC-DC converter.
Figure 9B:
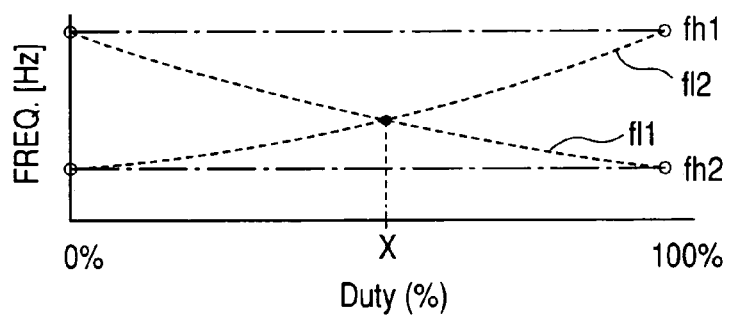

FIGS. 9A and 9B explain the relationship between switching frequencies corresponding to intervals formed between the falling edges of two drive pulses and duty control, as to a condition where intervals between the leading edges of the two drive pulses are spread (dispersed) into two amounts. As shown in FIG. 9A, a basic pattern (i.e., basic drive pulse pattern) consisting of mutually different two intervals Th1 and Th2 is repeated for setting an interval between leading edges. In this case, the switching frequencies fl1 and fl2 provided by the intervals Tl1 and Tl2 are changed as shown in FIG. 9B during a change in the duty. In FIG. 8B, when the duty is X %, the two switching frequencies of two intervals formed between two falling edges, pulse by pulse, respectively, agree with each other.

Figure 10A:
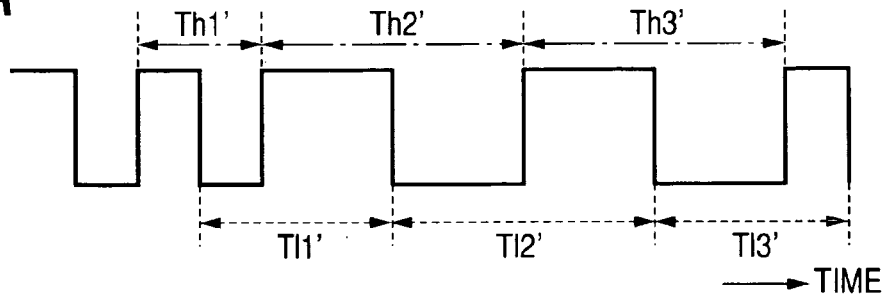
FIGS. 10A and 10B explain the drawback resulting from duty control carried out in the DC-DC converter.
Figure 10B:
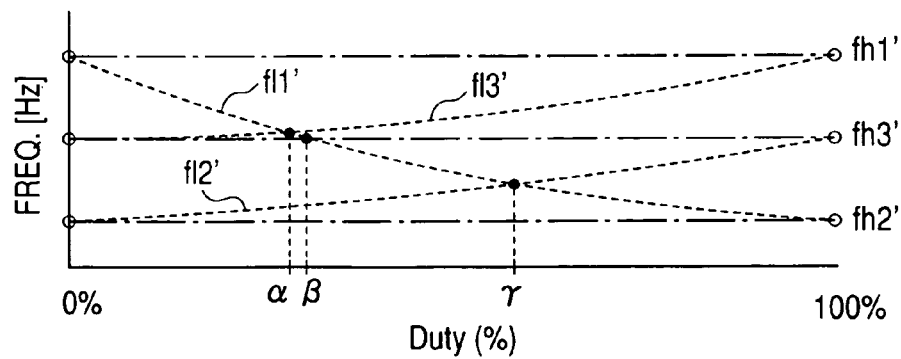
Figure 11:
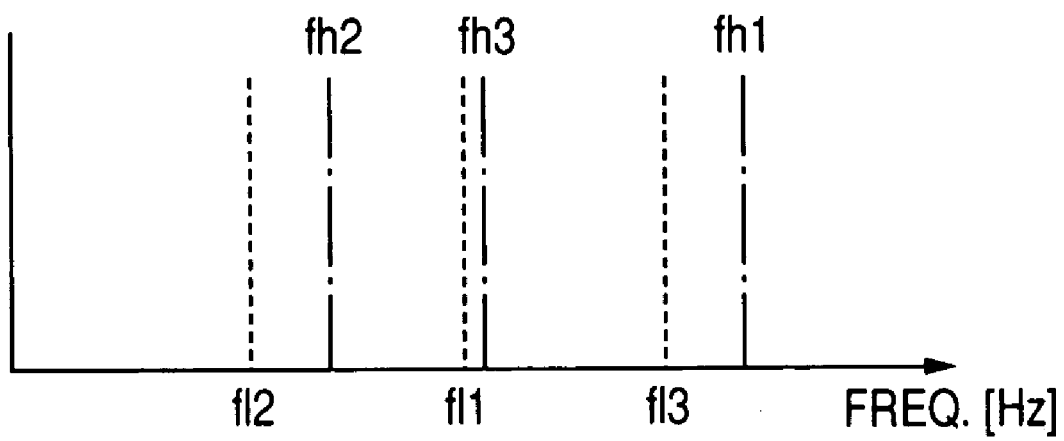
FIG. 11 explains the drawback resulting from duty control carried out in the DC-DC converter.

FIGS. 10A and 10B explain the relationship between switching frequencies corresponding to intervals formed between the falling edges of two of three drive pulses and duty control, as to a condition where intervals between the leading edges of two of the three drive pulses are spread into three amounts. As shown in FIG. 10A, a basic pattern (i.e., basic drive pulse pattern) consisting of mutually different three intervals Th1'-Th3' is repeated for setting an interval between leading edges. In this case, the switching frequencies fl1'-fl3' provided by the intervals Tl1'-Tl3' are changed as shown in FIG. 10B during a change in the duty. In FIG. 10B, when the duty is α %, β % and γ %, respectively, the two switching frequencies of two intervals formed between two falling edges or two leading edges, pulse by pulse, respectively, agree with each other. Thus, even if the switching frequencies are spread in the manner described in FIG. 6B, changes in the duty will cause an overlap in the switching frequencies, as shown in FIG. 11.

Furthermore, when the interval between leading edges of drive pulses is spread to 4 amounts, the duty which allows switching frequencies to agree with each other is 9 points at the maximum. The more the number of intervals subjected to the shift in the basic patter, the more the duty at which switching frequencies agree with other.

In this way, in performing the duty control, some duties may cause overlaps between or among switching frequencies. To eliminate such overlaps, the present embodiment adopts the way of having a plurality of basic patterns (basic drive pulse patterns), which are different from each other, and conducting switchovers among the plural basic patterns depending on a duty to be demanded. In the present embodiment, two basic patterns are exemplified.

Figure 12A:
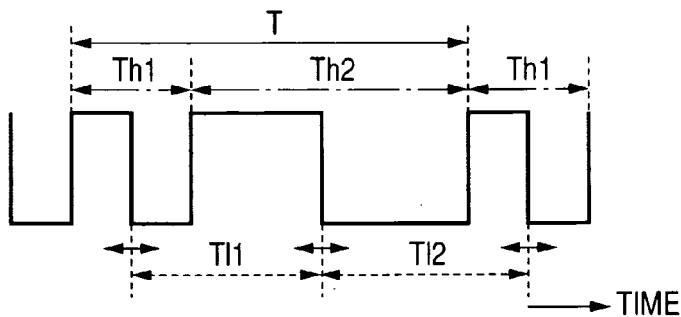
FIGS. 12A-12D explain a mode of duty control carried out in the first embodiment.
Figure 12B:
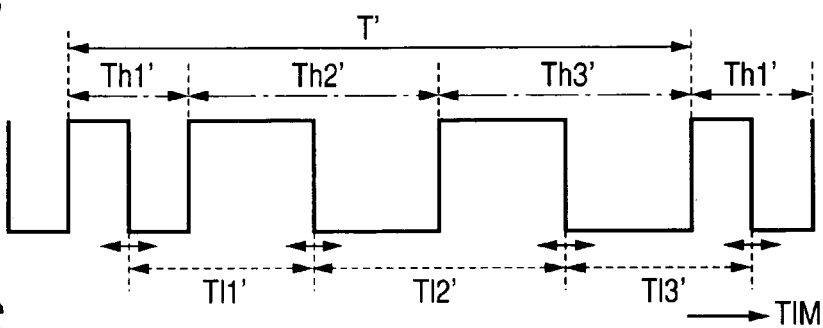

Referring to FIGS. 12A-12D, how to conduct the duty control will now be descried. FIG. 12A shows the basic pattern 1, while FIG. 12B shows the basic pattern 2. The information indicating those basic patterns 1 and 2 are stored in advance in the memory 32 in the controller 30. The information about the basic pattern 1, which is stored in the memory 32, consists of pieces of information showing the intervals Th1 and Th2 between the leading edges in FIG. 12 and the order of those intervals Th1 and Th2. A frequency obtained on the repetition cycle T (=Th1+Th2) of the basic pattern 1 is set to a value higher than specified audio frequencies.

Meanwhile, the information about the basic pattern 2, which is stored in the memory 32, consists of pieces of information showing the intervals Th1', Th2' and Th3' between the leading edges in FIG. 12B and the order of those intervals Th1' to Th3'. A frequency obtained on the repetition cycle T' (=Th1'+Th2'+Th3') of the basic pattern 2 is set to a value higher than specified audio frequencies.

Figure 12C:
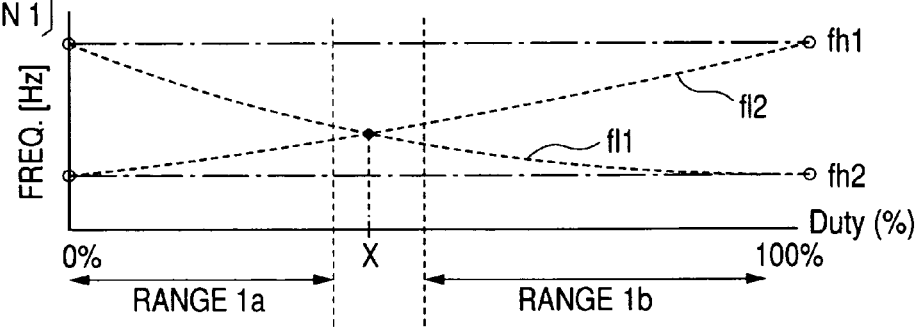
Figure 12D:
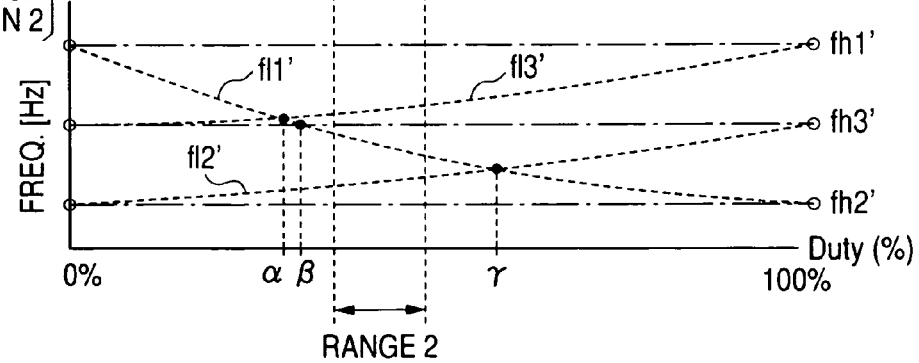

Further, in the present invention, pieces of information showing both usable-duty ranges 1a and 1b for the basic pattern 1, which are illustrated in FIG. 12C, and a usable-duty range 2, which is illustrated in FIG. 12D, are previously stored in the memory 32 of the controller 30. This makes it possible to selectively switch the basic patterns 1 and 2 in response to a desired duty value. Performing switchovers between the basic patterns 1 and 2 in that way allows the duty to be changed in a controlled manner on condition that the switching frequencies produced from the respective intervals between the leading edges and between the falling edges are not overlapped with each other in the frequency axis.

In addition, the usable-duty ranges 1a and 1b and 2 are set on condition that the usable duties are not overlapped between the basic patterns 1 and 2 and both edges of the usable-duty ranges 2 are continuous to the usable-duty ranges 1a and 1b, respectively, so that the duty can be decided without discontinuity.

Figure 17A:
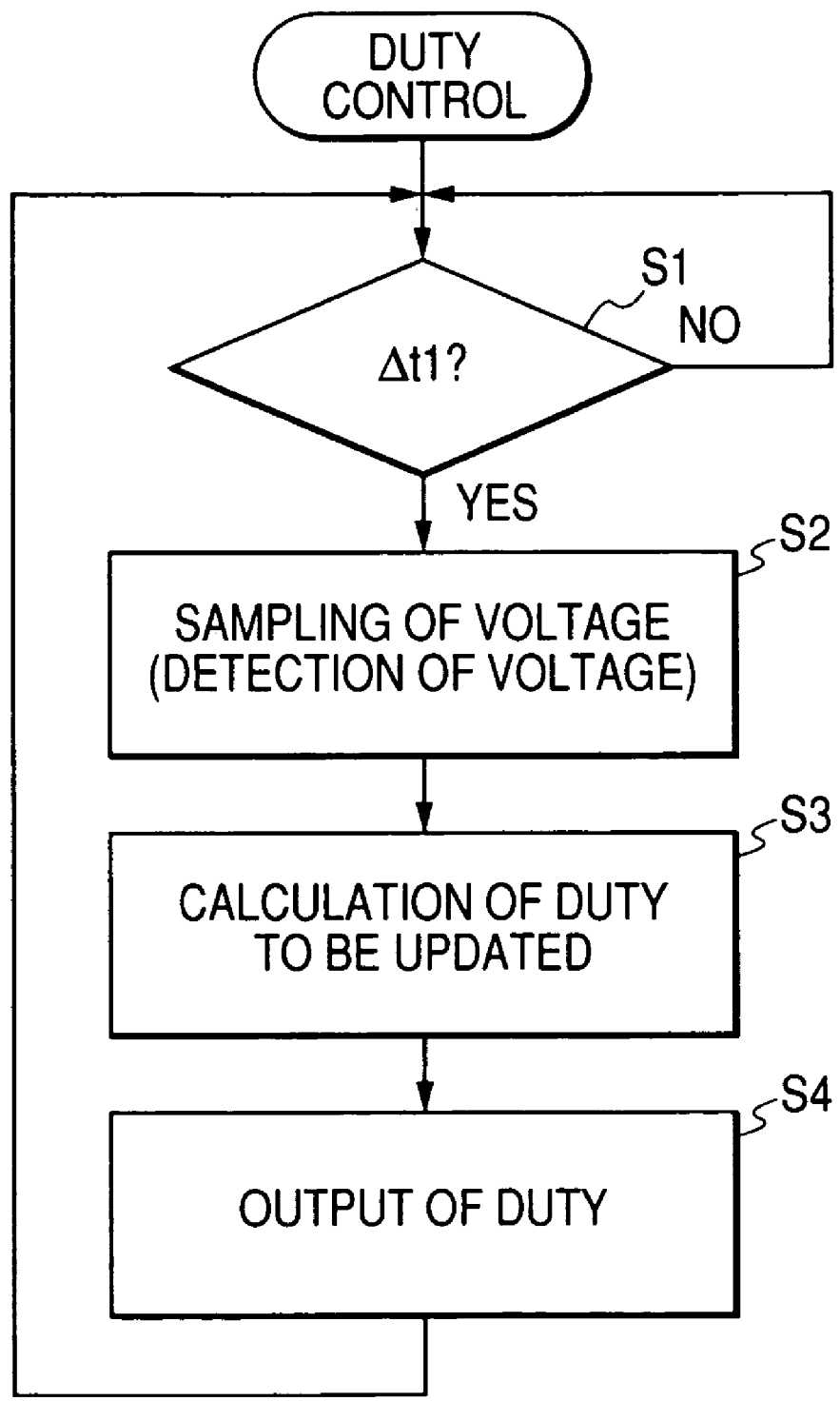
FIGS. 17A and 17B are flowcharts outlining the operations of a controller of the DC-DC converter in the first embodiment.
Figure 17B:
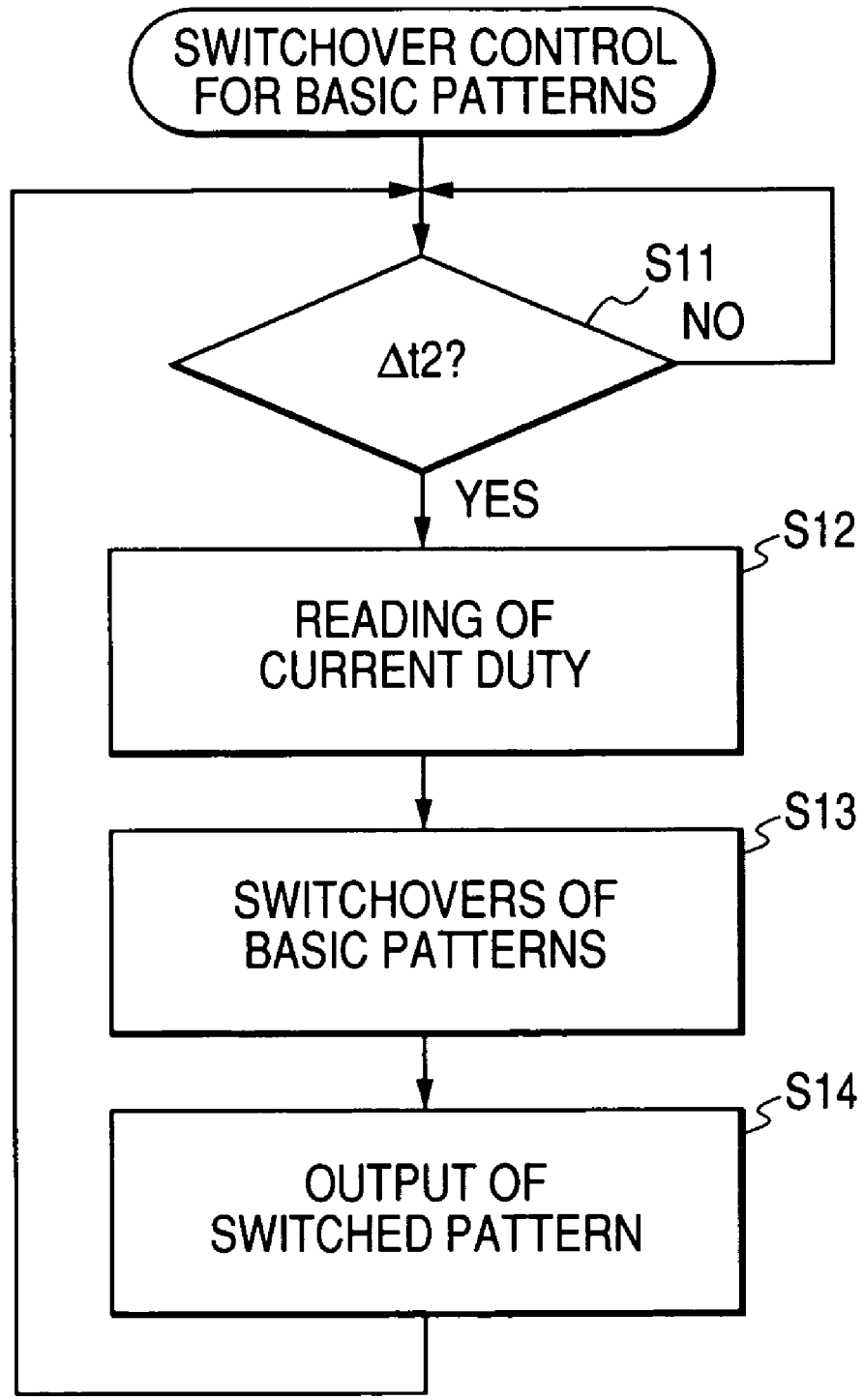

Using FIGS. 17A and 17B, the entire operations executed by the CPU 31 will now be outlined.

The CPU 31 is formed to operate on, at least, two types of timer interruptions. One of the timer interruptions, which is shown in FIG. 17A, is based on a minute interval $\Delta t1$ and for controlling the duty to a desired value in a feedback manner, while the other, which is shown in FIG. 17B, is based on a further interval $\Delta t2$ (>$\Delta t1$) and for periodically and selectively setting a basic pattern (that is, periodical switchovers between the basic patterns 1 and 2).

In the timer interruption processing shown in FIG. 17A, the CPU 31 determines whether or not the interval Δt1 has passed (step S1). When the interval Δt1 has passed, the CPU 31 detects the current output voltage of the DC-DC converter 20 (step S2). This detection includes sampling the potential on the line L2. Then, using a PID (proportional plus integral plus derivative) action technique, the CPU 31 calculates a value of the duty to be updated for controlling the output voltage of the DC-DC converter 20 to a desired target value (step S3). Information in relation to the calculated new duty is provided from the CPU 31, that is, the microcomputer 30, to the driver 40, so that the driver 40 operates on the new pulse output in order to provide the power switching element 26 with new on/off timings (step S4).

Meanwhile, in the timer interruption processing shown in FIG. 17B, the CPU 31 determines whether or not the interval Δt2 has passed (step S11). When the interval Δt1 has passed, the CPU 31 detects reads out the value of the current duty (step S12). Then, depending on the value of the current duty, the CPU 31 selects either the basic patterns 1 or 2, as described above (step S13; refer to FIGS. 12C and 12D). Information specifying the selected basic pattern 1 or 2 is memorized in a work area of the CPU 31 as information showing the currently selected basic pattern (step S14).

The basic patterns are selectively set and the duty for the power switching element 26 is controlled as described above, the switching frequency is spread (dispersed). It is therefore possible to avoid a situation in which the energy of noise caused due to the switching control is obliged to be larger at specific frequencies. Moreover, the spread frequency, which is an inverse number of the repetition cycle of a specified basic pattern, is decided to be higher than a specified audio frequency range. Hence, even if spread frequencies and/or their harmonic frequencies are made to overlap with the frequency of a broadcasting signal tuned by the receiver 18, the noise from the speaker 19 can be deviated from the audio frequency range.

Thus, in the present embodiment, even if the switching frequency is set in a long wave (LW) bandwidth in which its harmonic having a relative lower degree may overlap with the AM broadcasting bandwidth or in a middle wave (MW) bandwidth used for the AM broadcasting, the AM broadcasting can be heard in a good condition. Additionally, setting the switching frequency at a relatively high frequency allows the DC-DC converter 20 to be made more compact.

In summary, the following advantages can be provided in the present embodiment.

First, the basic pattern, which provides intervals between two adjacent on-operation start timings and intervals between two adjacent off-operation start timings, is repeated to switch the power switching element 26 and the spread frequency, which is an inverse of the repletion time of this basic pattern, is set to be higher than specified audio frequencies. The frequency for the switching control is thus spread (i.e., dispersed), so that an average energy level of noise attributable to the switching control can be reduced. Moreover, the spread frequency is higher than the specified audio frequencies, whereby noise included in the final output from the speaker 19 is prevented from being within the audio frequency range. This is effective for eliminating the influence of the noise from the transmission of sound information.

Secondary, the intervals between leading edges of two drive pulses are set by repeating a basic pattern consisting of a plurality of mutually different intervals of pulses. And the duty in each of those plural mutually different intervals is variably controlled on condition that an overlap is not made among the switching frequencies based on the edge timings of drive pulses. Thus the energy level of noise due to overlaps between or among the intervals between edges of the drive pulses can be prevented from increasing.

Third, a plurality of mutually different basic patterns are provided as the basic pattern, resulting in a desired switchover among the plural basic patterns in response to a demanded duty amount for on/off controlling the power switching element 26. It is therefore possible that, if the switching frequencies are obliged to overlap with each other when a demanded duty is set using one of the plural basic patterns, a switchover can be made to another basic pattern. This switchover allows the switching frequencies from being separated from each other. In this way, mutual overlaps between or among the switching frequencies (that is, the frequencies calculated on the leading and falling edge timings of drive pulses) are avoidable steadily, while a demanded duty can be set for on/off controlling the power switching element 26.

Second Embodiment

Figures 13, 14:
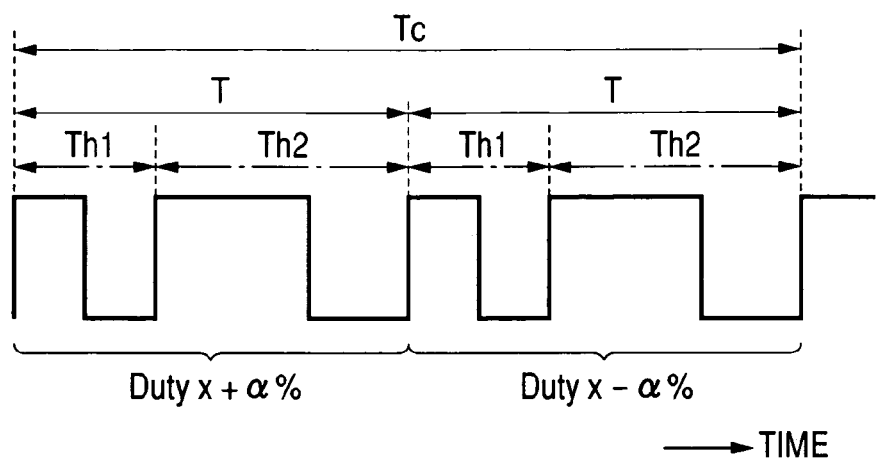
FIG. 13 explains a mode of duty control carried out in a second embodiment according to the present invention.
FIG. 14 explains a mode of duty control carried out in a third embodiment according to the present invention.

Referring to FIGS. 12A and 13, a second embodiment of the switching device according to the present invention will now be described. Incidentally, in this second embodiment, for the sake of a simplified explanation, the identical or similar components to those in the first embodiment will be referenced by the same reference numerals as those in the first embodiment. This manner is also true of succeeding embodiments to the second embodiment.

While, in the first embodiment, a plurality of mutually different basic patterns are provided to selectively switch the basic patterns depending on a duty to be commanded, another duty variable control is conducted in the second embodiment. Specifically, under a condition where an average duty, which is defined as a ratio of a total time of "on" intervals (intervals of logical "H") or "off" intervals (intervals of logical "OFF") to a predetermined period of time, is set to a duty to be commanded, the duty is variably controlled, during which duty values of some of the cycles of "on" and "off" operations are made different from each other. This processing is also performed by the microcomputer 31.

To be more specific, the second embodiment uses only the basic pattern 1 shown in FIG. 12A, but the basic pattern 2 is not used. In this case, at a duty of "X %," the two switching frequencies fl1 and fl2 calculated on the falling edges are equal to each other. Hence, when a duty to be commanded is "X %," the duty is controlled such that, as shown in FIG. 13, two cycles of the basic pattern 1 are assigned to a predetermined period of time "2×T," which is regarded as a control cycle Tc, and the duty during this control cycle Tc is set (adjusted) to "X %" on the average. As a practical example, the duty is set to "X+α %" for the first repetition cycle T of the basic pattern during each control cycle Tc, whilst the duty is set to "X−α %" for the second repetition cycle T of the basic pattern. This way of setting the duty over the control cycle Tc removes a duty of "X %" during each cycle itself of the basic pattern, while still allowing the duty to be "X %" on the average.

Meanwhile, a duty to be commanded is not "X %," a duty which is common to respective cycles of the basic pattern may be set. In such a case, however, for avoiding discontinuous switchovers between duties at a duty to be commanded of "X %," it is preferred that the duty may be differentiated between the first repetition cycle T and the second repetition cycle T during the control cycle Tc. For instance, when assuming that a duty to be commanded is DT, the duty for the first repetition cycle T of the basic pattern may be set to "DT+α{1−|DT−X|/100}," whereas the duty for the second repetition cycle T of the basic pattern may be set to "DT−α{1−|DT−X|/100}."

As described, the structure of the switching device according to the second embodiment provides a further advantage as well as the foregoing first and second ones gained in the first embodiment.

The duties for the first and second repetition cycles T of a basic pattern are differentiated, provided that an average duty during a predetermined control cycle Tc is assigned to a duty to be commanded. This is able to remove, from the duty control for the power switching element 26, a duty (e.g., "X %" as exemplified) at which switching frequencies are overlapped with each other. Further, by using the average duty as a duty to be commanded, the duty to be commanded is still secured, with mutual overlaps of the switching frequencies avoided in a controlled steady manner.

Third Embodiment

Referring to FIG. 14, a third embodiment of the switching device according to the present invention will now be described.

In the present embodiment, in addition to avoiding mutual overlap between (or among) the switching frequencies (fundamental frequencies) originated from the edge timings of drive pulses, the duty control includes avoiding mutual overlaps between plural harmonic frequencies of the switching frequencies in the AM radio broadcasting frequency band.

In the present embodiment, the term "overlap of harmonics" is defined such that a difference between the frequencies of plural harmonics exists within a frequency band assigned to each AM broadcasting station in the AM broadcasting frequency band from which noise due to the switching frequencies is desired to be removed. In Japan, if the difference between harmonic frequencies is within "9 kHz," it is said that the frequencies are overlapped with each other.

Specifically, bits of information expressing both a plurality (N-piece) of basic patterns and a map shown in FIG. 14 are stored in advance in the memory 32 of the controller 30.

The map shown in FIG. 14 is formed such that duties are written for every basic pattern. In the map, the written duties are set so as to remove, in the frequency band for the AM broadcasting, overlaps between or among some of both the harmonics of switching frequencies defined by each basic pattern and the harmonics of switching frequencies calculated on intervals between falling edges of drive pulses subjected to the duty control based on the basic pattern.

In the map shown in FIG. 14, solid-line and dotted-line circles both show duty ratios that are able to remove overlaps between the harmonics of the above switching frequencies. However, only the duties shown by the solid-line circles are set to be used for actual applications. This setting permits the controller 30 to uniquely decide which basic pattern to use, in cases where there are provided plural basic patterns that provide duty values enabling the removal of overlaps, in the AM radio broadcasting frequency band, between or among plural harmonics of switching frequencies.

In addition, this setting also takes it account a situation where there are adjacent, but usable, duty values on the same basic pattern in order to avoid frequent switchovers among the basic patterns. In such a case, the same basic pattern is employed even if there are other basic patterns available for deciding a desired duty. For example, in the case that a "2% duty" can be decided on either the basic pattern 1 or the basic pattern N, but a "1% duty" is decided based on the basic pattern 1, the basic pattern 1 is also selected to decide a "2%" duty.

As a result, the third embodiment is able to provide another advantage as well as the foregoing first and second advantages gained in the first embodiment.

That is, the power switching element 26 is variably controlled at duty ratios that prevent overlaps between or among plural harmonics of switching frequencies, so that the energy level of noise at frequencies at which harmonics are overlapped with each other.

Modifications

The foregoing various embodiments may be developed into various types of modifications, which will now be descried hereinafter.

In the second embodiment, the control cycle Tc is set to a period of time which is double the repetition cycle T of the basic pattern. But this is not a definitive list, but the control cycle Tc can be set thrice or more the repetition cycle T.

Further, as one mode, the duty variable control is performed such that, on condition that an average duty is set to a duty to be demanded, some of the duties for the intervals that allow the power switching element 26 to be turned on/off are differentiated from each other, as described. In this duty variable control, the same duties are decided using the basic patterns, but it is not limited to this way. By way of example, in FIG. 13, both a duty based on the interval Th1 of the first basic pattern and a duty based on the interval Th2 of the second basic pattern can be set to a "X+α %," whilst both a duty based on the interval Th2 of the first basic pattern and a duty based on the intervals of Th1 of the second basic pattern can be set to a "X−α %."

Furthermore, the duty control which removes overlaps between or among the switching frequencies derived from the leading and falling edges of drive pulses is not limited to modes described in the foregoing embodiments and modifications. By way of example, information about the basic pattern shown in FIG. 12A and information about the duty-usable range "1*b*" shown in FIG. 12C may be stored alone in the memory 32, so that the duty in only the duty-usable range "1*b*" can be subjected to the duty control.

A further modification is concerned with how to decide what kinds of intervals between edges of drive pulses. That is, the present invention is not limited to a mode in which the intervals are defined between leading edges of drive pulses. Alternatively, the intervals may be decided between falling edges of drive pulses. Another modification is that the logical "L" level of drive pulses is made to correspond to the on-operations of the power switching element 26, while the logical "H" level of drive pulses is made to correspond to the off-operations of the power switching element 26.

Another modification is concerned with how to set a basic pattern. Such a setting manner will not be limited to the ones shown in the foregoing embodiments and modifications, but may be developed into further various modes. In cases where such a setting is made, it is possible that a spread frequency or its harmonic frequencies is made not to overlap with a switching frequency defined by a basic pattern or its harmonic frequencies in a desired frequency band in which the switching device should be protected from the noise. In that case, noise caused at frequencies for the switching control can be dispersed more.

Furthermore, a frequency range to which the foregoing noise reduction is desired is not limited to all the radio frequency range (for example, all the AM radio frequency range "510-1710 kHz" in Japan) as described above, but this is not a definitive one. For example, a frequency range to be desired for the noise reduction may be part of all the radio frequency range, such as a range "510-1000 kHz" or a range "1000-1710 kHz," depending on which range includes a user's tuning broadcasting frequency.

The switching control modes may be changed in accordance with which frequency range is selected. For example, in the case that the switching control is made in the LW band lower in frequency than the AM frequency range, it is difficult to remove mutual overlaps of the harmonics in all the AM frequency range. In such a case, however, it is better to variably set the mode (i.e., the basic pattern and the duty control) for the switching control, whereby such overlaps can be removed easily.

The foregoing setting of the basic pattern and the duty control can be develop into another configuration where overlaps between carrier frequencies to be broadcasted from respective radio stations and switching frequencies and the harmonic frequencies thereof are eliminated.

Further, if a vehicle is equipped with a position sensor such as GPS sensor, the switching control modes are variable in a controlled manner. For example, the frequency of a broadcasting signal to be tuned is detected based on vehicle's position information from the position sensor, and overlaps are removed between the detected broadcasting frequency and switching frequencies and harmonic frequencies thereof. Even in this variable control, it is preferable to raise the spread frequency beyond a specified audio frequency band, in view of changes in the characteristics of the DC-DC converter 20, driver 40 and the other components, because such changes, which may appear on account of changes in temperature, may bring about the foregoing overlaps in frequencies.

A radio signal to which the foregoing noise reduction is desired is not limited to the broadcasted radio signal from a radio station. For instance, such noise reduction can be used in a case where audio devices, such as CD (Compact Disc) reproduction device and MD (Mini Disc) reproduction device, and DVD (Digital Versatile Disc) devices are to be mounted on already shipped vehicles. In such a case, some devices has a medium in which audio information to be reproduced is stored and transmitted as a signal having a frequency within a radio frequency band. This way of transmission of the audio information allows the radio receiver 18 to be demodulated for the output from the speaker 19. In this case, the foregoing drawback descried as to the conventional technique is true. That is, when a switching frequency and/or harmonics hereof overlaps with the frequency used in reproducing the audio information, there is also a fear that the speaker 18 outputs audio noise. Thus, the present invention can also be applied to such an audio reproduction device. Further, in this case, the foregoing setting for avoiding overlaps between plural switching frequencies and their plural harmonics within a bandwidth per radio broadcasting station is effective, the bandwidth being near to the frequency used by the audio reproduction device. Therefore, even when the noise reduction is desired for only the frequency used by the audio reproduction device, it is possible that all the radio frequency band (for example, all the frequency band for the AM broadcasting) is subjected to the noise reduction, like the foregoing embodiment.

Figure 15:
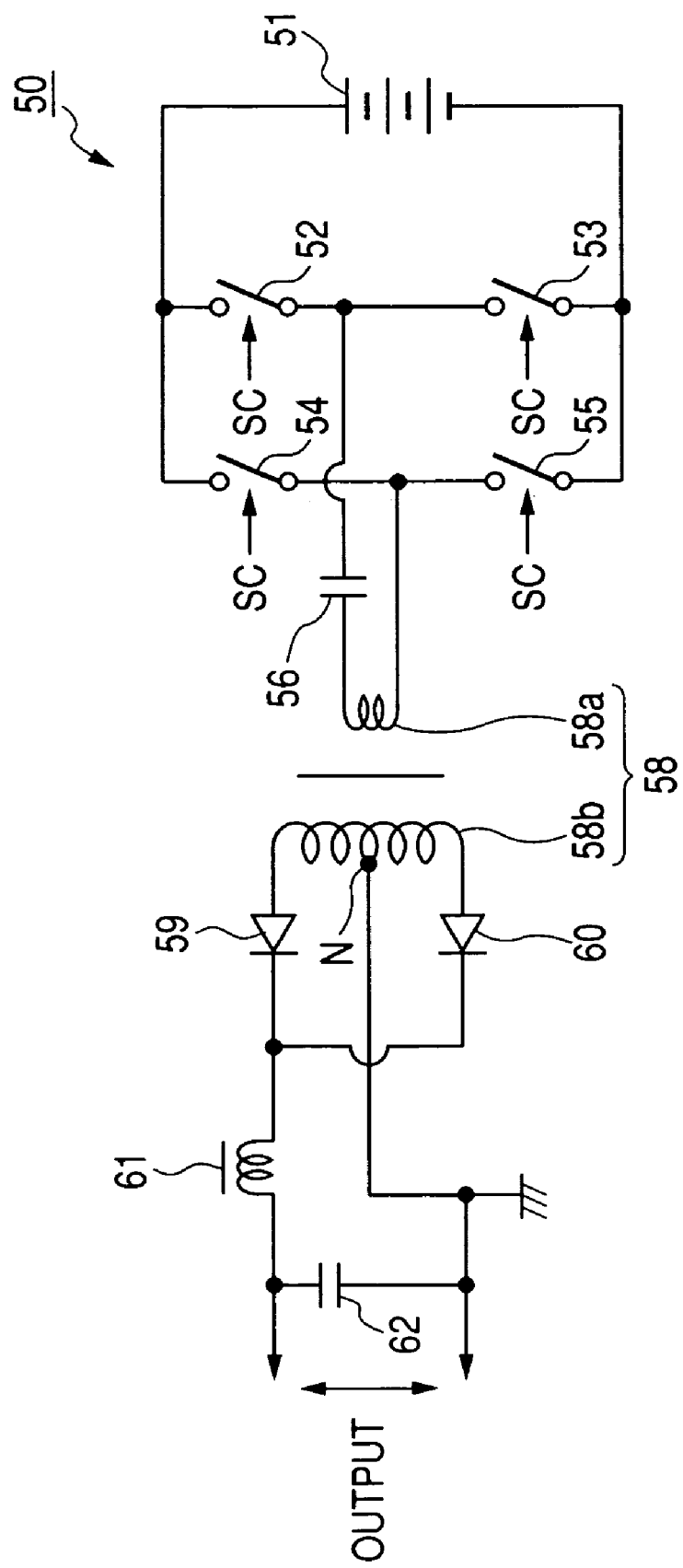
FIG. 15 is a circuit diagram showing the configuration of a DC-DC converter according to a modification of the embodiments.

Another modification is concerned with an object into which the switching device according to the present invention is installed. Such objects include the DC-DC converter 20 shown in FIG. 2, but this DC-DC converter 20 is not a definitive list. Such an object may be an insulated type of DC-DC converter 50 as shown in FIG. 15, which is different in the structure from the one shown in FIG. 2.

In this DC-DC converter 50, there is provided a high-voltage battery 51, which is in parallel with both a serial circuit composed of power switching elements 52 and 53 and a further serial circuit composed of power switching elements 54 and 55. These elements 52-55 receive a switching control signal SC for the on/off operations, respectively. An electric line connecting the elements 52 and 53 and a further electric line connecting the elements 54 and 55 are connected with a serial circuit composed of a capacitor 56 and a coil 58a of a transformer 58. The transformer 58 has a coil 58b, whose ends are connected to diodes 59 and 60, respectively, and their cathodes are mutually connected and also connected with one end of a coil 61. The other end of the coil 61 is ground via a further capacitor 62. The coil 58b of the transformer 58 has a node N, which is connected to the ground as well. Both ends of the capacitor 62 provide the output of this converter 50.

Figure 16A:
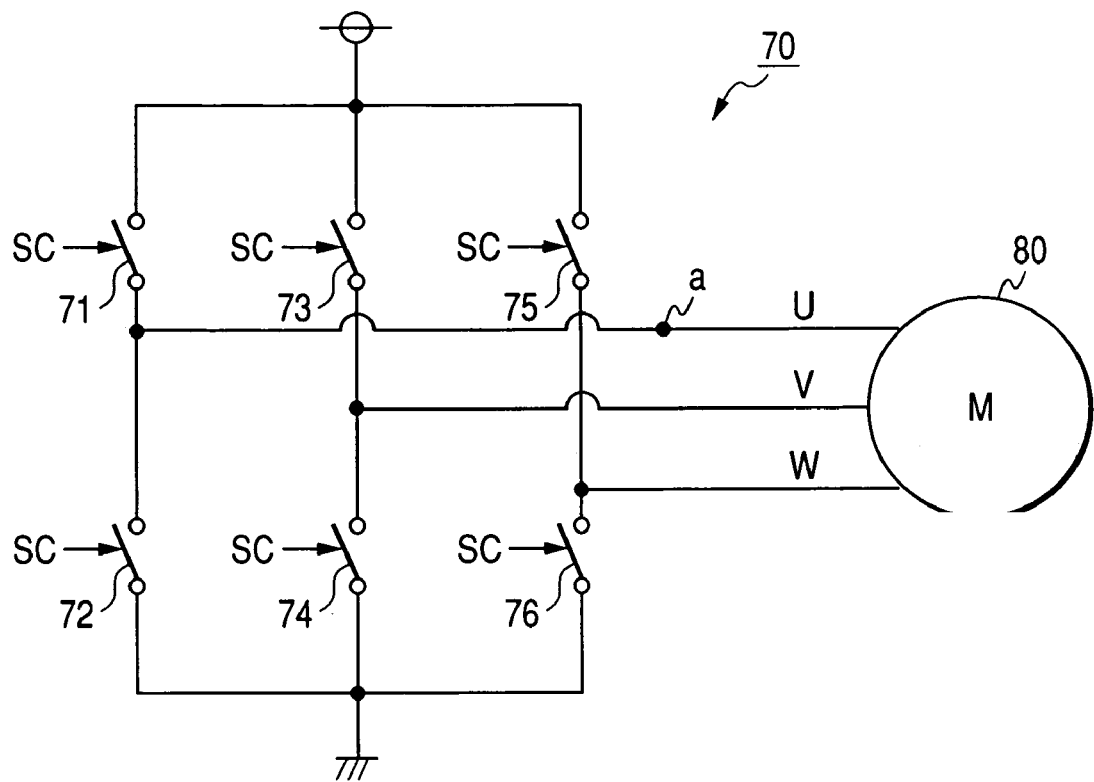
FIG. 16A is a circuit diagram showing an inverter to which the switching device according to the present invention is applied.
Figure 16B:
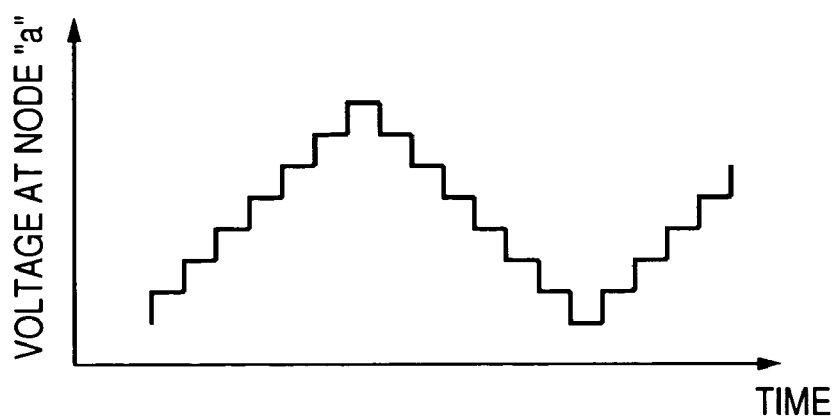
FIG. 16B explains the operations of the switching device in FIG. 16A.

Another applicable object is an inverter, which is exemplified in FIG. 16A. An inverter 70 in FIG. 16A is electrically connected to a power steering motor 80. This inverter 70 has three serial circuits each consisting of power switching elements 71 and 72 (73 and 74, and 75 and 76) and being placed between power supply voltage and the ground. These elements 71-76 receive a switching control signal SC for the on/off operations, respectively. The outputs U, V and W of this inverter are provided from the respective electric lines connecting each pair of the power switching elements. The switching control of the elements 71-76 allows the voltage at a node on the U output line to be changed as shown in FIG. 16B.

The switching frequency may be a frequency which falls into, for example, an FM broadcasting frequency band, not limited to a frequency in the AM radio frequency band or LW frequency band.

The on/off operations of the switching element (for example, the power switching element) according to the present invention are also be modified into further variable schemes. It is sufficient that such on/off operations are variably controlled based on any one factor of an interval themselves between start timings for mutually adjacent "on" operations, an interval themselves between start timings for mutually adjacent "off" operations, and an duty defined as a ratio of the on-duration (on-operated period) or off-duration (off-operated period) to the interval between start timings for mutually adjacent "on" operations or mutually adjacent "off" operations. Controlling the on/off operations on any of the above factors makes it possible to spread the switching frequencies resulting from the switching on/off operations, as described before.

In addition, the switching device according to the present invention is not limited to the one used for the hybrid vehicle, any other types of vehicles can employ this switching device, where noise mixed into the audio signal of a car audio device can be suppressed steadily.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A switching device comprising:
   a switching element that turns on/off in response to a drive signal which is set to control a controlled variable of a controlled system at a desired amount thereof;

control means that variably controls the switching element based on the drive signal; and setting means that sets the drive signal on the basis of a desired variable duty to control the controlled variable, wherein i) the drive signal is set by repeating a basic interval pattern comprising a period time T wherein the basic interval pattern consists of a plurality of intervals between leading edges Th or falling edges Tl of drive pulses and wherein all the intervals comprise different lengths to each other, so that overlaps in a frequency spectrum, among switching frequencies of both ON and OFF operations of the drive pulses are avoided even when the desired variable duty is changed for controlling the controlled variable, and ii) wherein, among a plurality of basic interval patterns which are different to each other and which are set so that the overlaps are avoided, the basic interval pattern is selectively switched in response to the desired variable duty.

2. The switching device according to claim 1, wherein the plurality of intervals each have a duty defined as a ratio of an ON period or an OFF period of the switching element to either the interval between the start timings of the ON operations or the interval between start timings of the OFF operations.

3. The switching device according to claim 2, wherein the control means includes duty control means for variably controlling a duty of each of the respective intervals depending on the desired amount of the controlled variable.

4. The switching device according to claim 3, wherein the duty control means has a memory previously storing information indicating the plurality of basic interval patterns and is configured to perform the variable control on the information about the duty stored in the memory.

5. The switching device according to claim 2,
wherein the setting means comprises selection means for selecting one of the plurality of basic interval patterns in response to the desired variable duty and giving the selected basic interval pattern to the control means.

6. The switching device according to claim 2, wherein the setting means includes differentiating means for mutually differentiating duties of plural intervals grouped among the intervals between the start timings of the ON operations and between the start timings of the OFF operations, on condition that an average duty defined as a ratio of a total time of the ON periods or the OFF periods to a predetermined control period is set to the desired variable duty.

7. The switching device according to claim 6, wherein the differentiating means is configured to mutually differentiate the duties of two adjacent intervals grouped among the intervals between the start timings of the ON operations and between the start timings of the OFF operations.

8. The switching device according to claim 7, wherein, of the two adjacent intervals, one of which has a duty larger than the desired variable duty by a predetermined amount and the other of which has a duty lower than the desired variable duty by the predetermined amount.

9. The switching device according to claim 2, wherein the setting means include means for adopting the desired variable duty that removes, as the overlaps, an overlap, in a desired frequency range, among frequencies of plural harmonics of switching frequencies produced based on an interval between start timings of the ON operations and an interval between start timings of the OFF operations.

10. The switching device according to claim 9, wherein the desired frequency range is a frequency range for AM radio broadcasting.

11. The switching device according to claim 1, wherein the plurality of intervals composing the basic interval pattern are composed of two intervals formed by either the leading edges or the falling edges of two types of drive pulses that provide the desired variable duty in each of the two intervals.

12. The switching device according to claim 1, wherein the plurality of intervals composing the basic interval pattern are composed of three intervals formed by either the leading edges or the falling edges of three types of drive pulses that provide the desired variable duty in each of the three intervals.

13. The switching device according to claim 1, wherein a period of time of the basic interval pattern is set to have a frequency that spreads switching frequencies, which correspond to the intervals between the leading edges or between the falling edges of the drive pulses, into a frequency range higher than a specified audio frequency.

14. The switching device according to claim 1, wherein the controlled system is a DC-DC converter installed in a hybrid car, the DC-DC converter powering a radio receiver including an AM radio receiver, and the controlled variable is an output DC voltage of the DC-DC converter.

15. The switching device according to claim 1, wherein the switching element is an electrical power switching element subjected to ON/OFF operations for a DC-DC conversion performed by the DC-DC converter.

16. A switching device comprising:
a switching element that turns on/off in response to a drive signal which is set to control a controlled variable of a controlled system at a desired amount thereof; and
a controlling unit i) that sets the drive signal on the basis of a desired variable duty to control the controlled variable, wherein the drive signal is set by repeating a basic interval pattern comprising a period time T wherein the basic interval pattern consists of a plurality of intervals between leading edges Th or falling edges Tl of drive pulses and wherein all the intervals comprise different lengths to each other, so that overlaps, in a frequency spectrum, among switching frequencies of both ON and OFF operations of the drive pulses are avoided even when the desired variable duty is changed for controlling the controlled variable, and wherein, among a plurality of basic interval patterns which are different to each other and which are set so that the overlaps are avoided, the basic interval pattern is selectively switched in response to the desired variable duty; and ii) variably controls the switching element based on the drive signal.

17. The switching device according to claim 16, wherein the plurality of intervals each has a duty defined as a ratio of an ON period or an OFF period of the switching element to either the interval between start timings of the ON operations or the interval between start timings of the OFF operations.

18. The switching device according to claim 17, wherein a period of time of the basic interval pattern is set to have a frequency that spreads switching frequencies, which correspond to the intervals between the leading edges or between the falling edges of the drive pulses, into a frequency range higher than a specified audio frequency.

* * * * *